G. WIBERG.
APPARATUS FOR PREPARING COFFEE, TEA, OR SIMILAR DRINKS.
APPLICATION FILED MAY 11, 1915.
1,225,690.
Patented May 8, 1917.
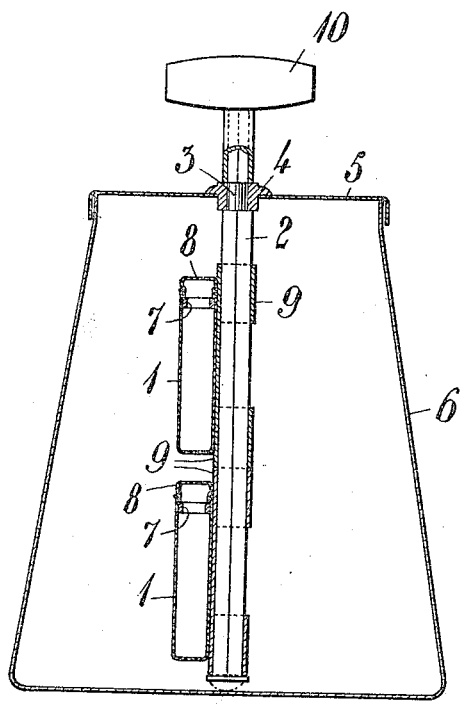
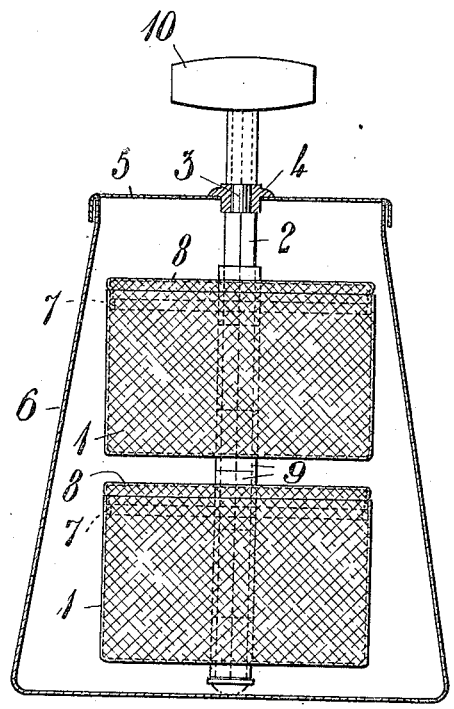
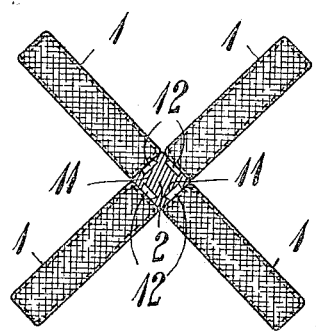
Inventor:
Georg Wiberg

UNITED STATES PATENT OFFICE.

GEORG WIBERG, OF STOCKHOLM, SWEDEN.

APPARATUS FOR PREPARING COFFEE, TEA, OR SIMILAR DRINKS.

1,225,690.  Specification of Letters Patent.  Patented May 8, 1917.

Application filed May 11, 1915. Serial No. 27,322.

*To all whom it may concern:*

Be it known that I, GEORG WIBERG, a subject of the King of Sweden, and resident of Stockholm, Sweden, have invented certain new and useful Improvements in Apparatus for Preparing Coffee, Tea, or Similar Drinks, of which the following is a specification.

My invention relates to an apparatus to be used for preparing coffee, tea and similar drinks and adapted to be placed in a vessel of any form and dimension either for ordinary or for automatic and continuous preparation. The apparatus consists of a box or receptacle of a lengthy form and of comparatively narrow width. The receptacle is made of wire gauze or of perforated sheet metal or other suitable material. It is in any suitable manner connected with or carried by a rod which can be inserted or fitted in a vessel in a vertical position. The rod rests with its lower end on the bottom of the vessel. However, it must be arranged in such a manner that it can be rotated from without the vessel, and the receptacle must be connected with the rod so as to be rotated with the latter, whereby the liquid in the vessel more easily penetrates the material coming in contact with all its parts or particles.

If the vessel receiving the apparatus is deep two or more receptacles may be attached one above the other on the rod. In case of continuous preparation the receptacles should be successively attached to the rod as required, and likewise be removed in the same way, without removing necessarily the rod from the vessel but only removing the cover of the vessel.

In the accompanying drawing are shown two different constructions of the new apparatus. In Figures 1 and 2 one form is represented. Fig. 1 is a vertical central section through one construction showing the receiving vessel and the apparatus inclosed therein, Fig. 2 being a section at right angles thereto. Fig. 3 is a horizontal section showing a star-like arrangement of the receptacles adapted to receive the coffee and the like.

In all the figures 1 designates the receptacles adapted to receive the ground coffee, or other material, 2 is a square rod having a cylindrical portion at 3 rotatably journaled in a bearing 4 in the cover 5 of the receiving vessel 6. On each receptacle there is fixed a metal band 7 and on this band the cover 8 of the receptacle is supported. To the band in the middle of the back of each receptacle is attached a hub 9. Each hub is fitted to the rod 2, and is of such a length that when two receptacles are placed one above the other on the rod 2, as shown in Figs. 1 and 2, the hubs 9 abut against each other and keep the receptacles 1 out of contact with each other. 10 is a handle adapted to be fastened to the upper square end of the rod 2 in order to rotate the rod. This rotation, however, may be effected by any other suitable means.

In Figs. 1 and 2 the two receptacles 1 are shown as placed on the same side of the rod 2, they may, however, be placed on opposite sides.

In Fig. 3 the rod 2 is also supposed to have a square cross section each face having a dove tail groove 11 extending lengthwise. The receptacles 1 are provided each with a projection 12 fitting in the groove. The grooves 11 may either extend down to the thicker end of the rod 2, in which case all the receptacles 1 will be at the same level, or the grooves 11 may terminate at different heights, in which case the receptacles will also be at different heights.

The grooves 11 and projections 12 may be reversed *i. e.* the projection may be provided on the rod 2 and the groove on the receptacles 1.

I claim:—

In an apparatus for making coffee, tea and so forth, the combination with the vessel adapted to receive the apparatus, a removable cover and a bearing therein, of a rod vertically journaled in said bearing and adapted to rest with its lower end on the bottom of said vessel, one or more foraminous containers of narrow width, a hub attached to the back of each container and fitted to the said rod, at the same time acting as spacers between two containers, and means for rotating said rod and said containers.

In testimony whereof I have signed my name to this specification, in the presence of two subscribing witnesses.

GEORG WIBERG.

Witnesses:
 GRETA PRIEN,
 ELIN WAHMAN.

Copies of this patent may be obtained for five cents each, by addressing the "Commissioner of Patents, Washington, D. C."